United States Patent
Dellock et al.

(10) Patent No.: US 10,730,267 B2
(45) Date of Patent: Aug. 4, 2020

(54) AMORPHOUS METAL BADGE

(71) Applicant: FORD GLOBAL TECHNOLOGIES, LLC, Dearborn, MI (US)

(72) Inventors: Paul Kenneth Dellock, Northville, MI (US); Michael A. Musleh, Canton, MI (US); Stuart C. Salter, White Lake, MI (US); David Brian Glickman, Southfield, MI (US); Richard Gall, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 193 days.

(21) Appl. No.: 16/055,309

(22) Filed: Aug. 6, 2018

(65) Prior Publication Data

US 2020/0039185 A1  Feb. 6, 2020

(51) Int. Cl.
| | |
|---|---|
| *B32B 15/08* | (2006.01) |
| *B32B 15/00* | (2006.01) |
| *B32B 15/085* | (2006.01) |
| *B29C 45/00* | (2006.01) |
| *B32B 27/32* | (2006.01) |
| *B29K 23/00* | (2006.01) |

(52) U.S. Cl.
CPC ........ *B32B 15/085* (2013.01); *B29C 45/0001* (2013.01); *B32B 27/32* (2013.01); *B29K 2023/12* (2013.01); *B29K 2905/08* (2013.01); *B32B 2250/03* (2013.01); *B32B 2307/41* (2013.01); *B32B 2307/702* (2013.01); *B32B 2451/00* (2013.01); *B32B 2519/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,650,723 | A * | 3/1987 | Furuya | B32B 15/08 428/622 |
| 4,749,625 | A * | 6/1988 | Obayashi | B32B 15/08 428/624 |
| 6,413,653 | B1 | 7/2002 | Araki et al. | |
| 6,760,989 | B2 | 7/2004 | Peterson et al. | |
| 8,247,050 | B2 * | 8/2012 | McCrea | C08J 7/123 428/35.8 |
| 8,906,515 | B2 * | 12/2014 | Tomantschger | C23C 18/1855 428/626 |
| 9,834,136 | B2 | 12/2017 | Roberts et al. | |
| 10,493,903 | B1 * | 12/2019 | Dellock | B60Q 1/2696 |
| 2005/0175843 | A1 | 8/2005 | Johnson | |

FOREIGN PATENT DOCUMENTS

| | | | | |
|---|---|---|---|---|
| CN | 104651759 A | | 5/2015 | |
| CN | 207425235 U | * | 5/2018 | ............... G09F 7/00 |
| DE | 3805693 A1 | | 2/1989 | |
| DE | 202005011127 U1 | | 9/2005 | |
| JP | 1-237410 A | * | 9/1989 | ............. G01C 21/04 |

OTHER PUBLICATIONS http://www.miladisplays.com/autonameplates.htm.

* cited by examiner

*Primary Examiner* — Rip A Lee
(74) *Attorney, Agent, or Firm* — David Coppiellie; MacMillan, Sobanski & Todd, LLC

(57) ABSTRACT

A badge may include an amorphous metal shell having a visible surface and an opposed back surface, and a plastic base molded to the back surface. The badge may also include a polymer visible layer molded to a portion of the visible surface.

18 Claims, 2 Drawing Sheets

AMORPHOUS METAL BADGE

BACKGROUND OF THE INVENTION

The present invention relates to decorative/informational badges, emblems or ornaments, and in particular to those including amorphous metal (bulk metal glass).

For some consumer goods, such as for example a vehicle, it may be desirable for badges (including emblems or ornaments) to have a luxury look and feel. In addition, for such luxury badges, it is desirable for the badges to remain essentially corrosion free and relatively scratch and dent resistant during the life of the product. It is also desirable to be able to provide for different types of luxury look and feel with minimal tooling cost, the ability for the tooling employed to form the badges to be able to operate with minimal maintenance, and having relatively fast cycle times.

Such a luxury look and feel may be those badges that have a chrome or metallic finish, as well as providing relatively intricate details. However, such luxury badges generally cannot be achieved with chrome plated plastic or other similar materials. On the other hand, while metallic badges (such as zinc die case or forged aluminum) may produce the desired luxury look and feel, they may be prohibitively expensive for particular applications, as well as weighing more than is desired.

Accordingly, it is desired to provide luxury look and feel badges, with the above noted desirable characteristics, while also minimizing weight and cost.

SUMMARY OF THE INVENTION

An embodiment contemplates a badge including an amorphous metal shell having a visible surface and an opposed back surface, and a plastic based molded to the back surface.

An embodiment contemplates a method of forming a badge including, molding an amorphous metal shell having a visible surface and an opposed back surface, and molding a plastic base to the back surface.

An advantage of an embodiment is that the badges have a luxury look and feel of a metal badge, but with lower cost and less weight. Moreover, such amorphous metal badges can be formed dimensionally precise, thus allowing for intricate details for any text or design on the badge, while still being generally corrosion free and scratch and dent resistant for the life of the product to which it is attached. Moreover, such badges allow for relatively long lasting tooling for forming the badges, with relatively fast cycle times for forming each badge. And, such badges may be formed with tooling that is highly polished to achieve a polished or chrome appearance, is sand blasted or grained to achieve a satin appearance, or some portions polished and other portions sand blasted, in order to obtain the desired luxury look and feel for the badge. Moreover, another advantage of an embodiment is that the badge may be insert molded into a functional component of the product (as opposed to molded and then mechanically attached).

DETAILED DESCRIPTION

Figure 1:
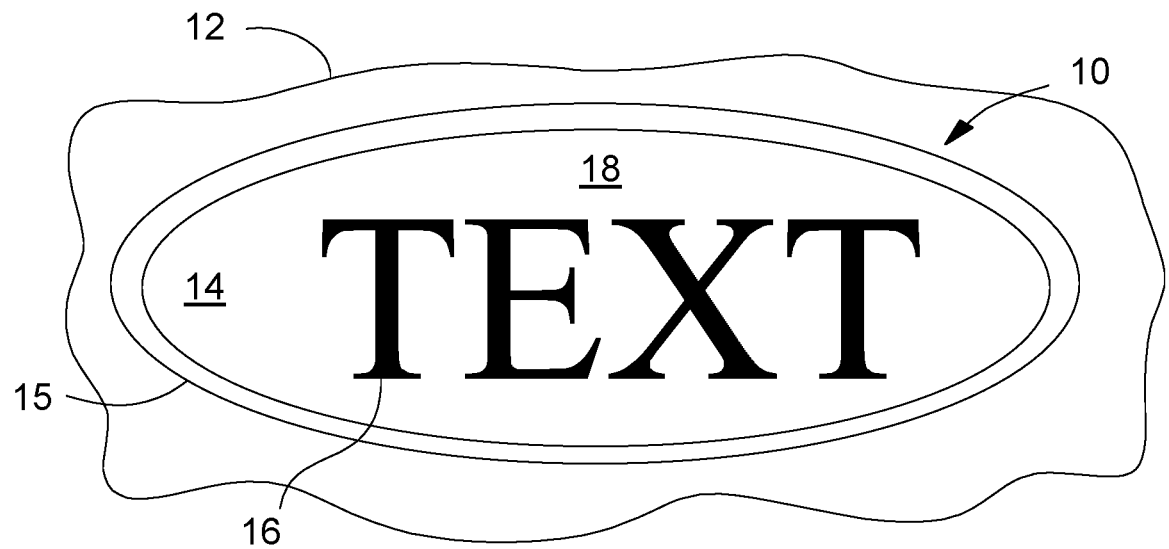
FIG. 1 is a schematic view of a badge mounted on structure.

FIG. 1 illustrates a badge 10 mounted or molded to structure 12, which may be for example the interior or exterior structure of a vehicle. The visible (front) surface 14 of the badge 10 generally comprises amorphous metal that is formed as a bulk metal glass (BMG) molded shell 15. The amorphous metal may be, for example, a zirconium based alloy or a nickel chromium alloy. A portion of the surface 14 may form precision molded details 16 of a design, such as for example text, surrounded by background portions 18 of the surface 14, which may be shaped in a curved or flat geometry, as is desired for the particular badge design. The badge 10 may be molded first and then attached to the structure 12, or the badge 12 may be insert molded to the structure 12 itself (such as for example, insert molding into a vehicle grille, steering wheel or other plastic part).

Figure 2:
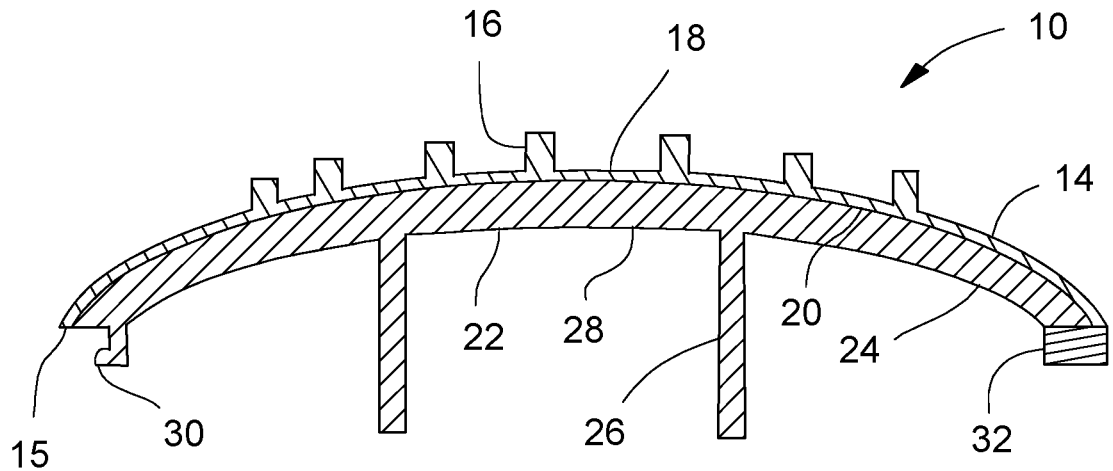
FIG. 2 is a cross section through a badge.

FIG. 2 (discussed with reference to FIG. 1) illustrates a cross section through the badge 10, which includes the visible (front) surface 14 formed from the amorphous glass of the BMG shell 15, with the precision molded details 16 extending outward from the background portions 18. The amorphous metal, then, is a BMG molded shell 15 with the details 16 molded with the shell 15.

To the back surface (non-visible portion) 20 of the BMG shell 15 is a molded a plastic base 22 (such as injection molded thermoplastic), which is fixed to the shell 15. The base 22 has a body 24 that provides support to the BMG shell 15 and from which various attachment apparatuses extend. Since the amorphous metal may be relatively expensive, it may be desirable to mold the BMG shell 15 as thin as possible, with the body 24 providing support to the relatively thin shell 15. This keeps the cost down, while still maintaining the structural integrity of the badge 10 and providing the luxurious look and feel of the visible surface 14 that is seen and touched by the product users.

The attachment apparatuses may include locators 26, which may extend rearward from the backside 28 of the body 24, with such locators 26 fitting into holes (not shown) in the structure 12 to properly locate and align the badge 10. The locators 26 may also optionally include some type of securement mechanism, such as for example Christmas tree barbs (not shown) or threads (not shown) for receiving nuts (not shown), that help to secure the badge 10 to the structure 12.

Other attachment apparatuses molded as part of the base 22 may include one or more molded securement hooks 30 that are received in holes (not shown) in the structure 12 to assist in mounting the badge 10 to the structure 12. In addition, an adhesive or tape 32 may be secured between the badge 10 and the structure 12 to mount the badge 10 to the structure 12. The tape 32 may be used in conjunction with the locators 26 and hooks 30 to secure the badge 10 to the structure 12 in the proper location and orientation.

Figure 3:
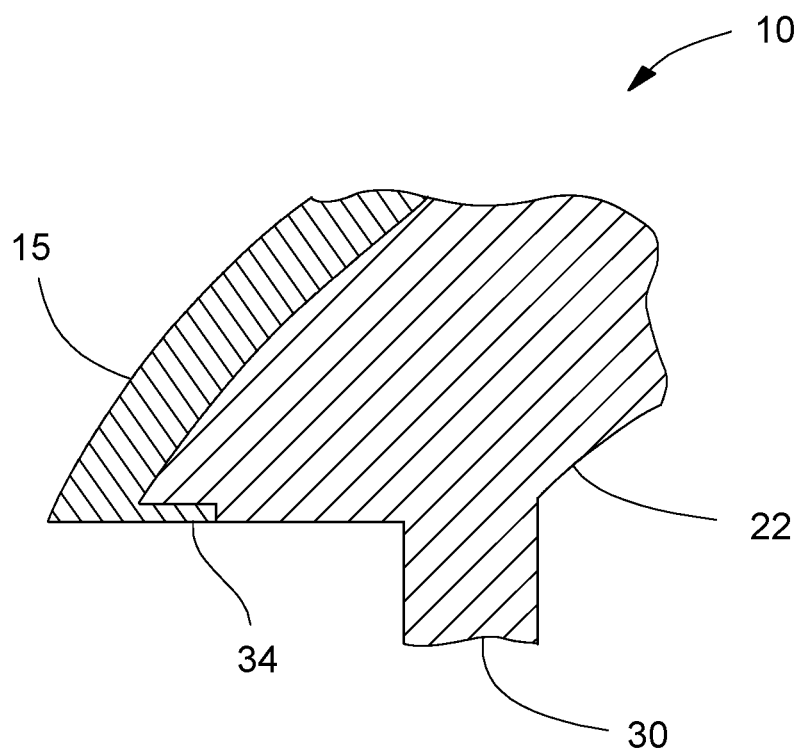
FIG. 3 is a cross section, on an enlarged scale, showing a portion of a badge.

FIG. 3 shows a detail of a portion of the badge 10 where the BMG shell 15 is molded with an optional undercut 34, which helps to better secure the BMG shell 15 to the base 22.

The molding operation for forming the badge of FIGS. 1-3 may be carried out as follows, if so desired. Crystalline ingots may be melted under a vacuum, and the cavity for molding the BMG shell 15 may be heated (for example using induction heating), which reduces the viscosity of the amorphous metal material during initial molding, enabling the molding of a thinner layer of shell 15. The heating may be used to heat the tool to a temperature that approaches the crystallization temperature of the material being molded. The temperature difference between the tool and the molten amorphous metal may be less than about 200 degrees Celsius and preferably at or less than a difference of 150 degrees Celsius. This may, for example, allow for a reduction in thickness of the shell 15 from a typical 0.6 millimeters to about or slightly less than 0.3 millimeters, and also extend the life of the tool due to a reduced temperature differential between molten amorphous metal and the tool surface during the molding process.

When the amorphous metal is fully molten, the molten material may be injection molded into the heated tool under pressure. The tool may be, for example, a steel tool. Once injected, the heating of the tool is turned off, allowing the molded part to cool relatively quickly. The optional undercuts 34 may be molded into the shell 15 during this molding process, if so desired. The molded part may be transferred to a finishing station where molding gates and runners are removed. The visible surface may be complete as molded, and may not need any further finishing.

The thin BMG shell 15 may then be placed in an injection molding machine, which may be conventional if so desired. A thermoplastic may then be injected into the machine on the back surface of the shell 15, forming the plastic base 22 (including the attachment features, such as locators 26 and securement hook 30). For desirable bonding of the base 22 to the shell 15, one may, for example, us a polypropylene material modified with about one percent maleic anhydride for the material of the plastic base 22.

After the molding is complete, then optional features may be added, such as for example, affixing the tape 32 and/or painting/powder coating portions of the visible surface 14 to further enhance the luxury look of the badge 10. The badge 10 may now be installed to the structure 12 to provide a product having a badge with the luxury look and feel.

Figure 4:
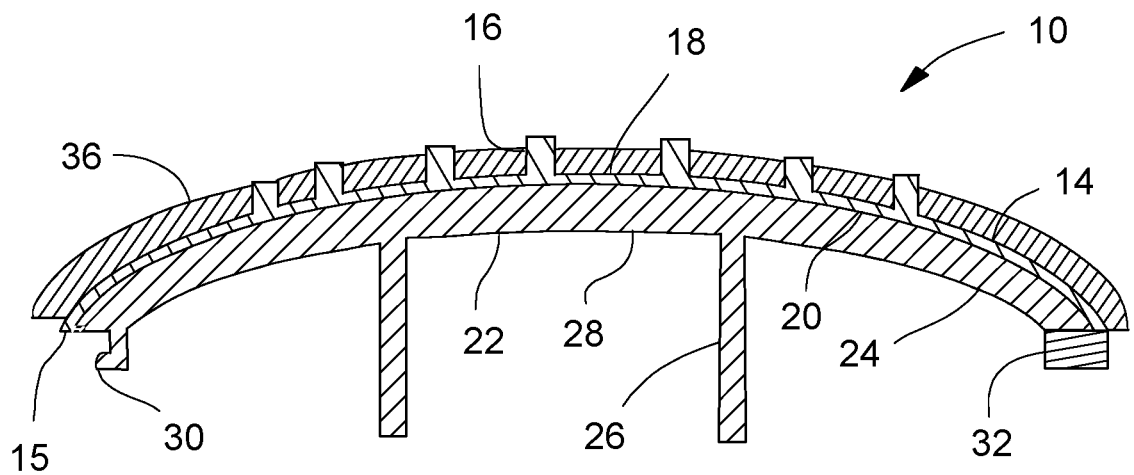
FIG. 4 is a cross section through a badge, according to an alternate embodiment.

FIG. 4 is similar to FIG. 2, and so similar elements in the two figures will be given the same element numbers and the detailed discussion thereof will not be repeated. In FIG. 4, the BMG shell 15 and plastic base 22 may be essentially the same as FIGS. 2 and 3, if so desired. An additional visible layer of polymer 36 is over-molded onto the shell 15. This visible polymer layer 36 may have a color that provides contrast with the details 16 of the BMG shell 15 that now protrude through this added layer 36. Such an arrangement may provide the luxury appearance of being paint over chrome, when in fact, it is the colored polymer layer 36 over the BMG shell 15. The polymer layer 36 may be a thermoplastic material, such as for example acrylic, and may be fully opaque or only semi-opaque.

The molding operation for FIG. 4 may be similar to that for the badge 10 of FIGS. 1-3, with the added process of preparing the portion of the visible surface 14 of the badge 10 to which the polymer will be applied. This may be accomplished by, for example, using plasma to clean and treat this portion of the visible surface 14, which will allow the polymer to better stick to the surface 14. The badge 10 may then be placed in an injection mold, and a layer of plastic (such as acrylic) is injected over the visible surface 14 (or a portion thereof). The liquid metal details 16 may extend out through the polymer layer to provide added texture to the badge 10, thus enhancing the luxury look and feel.

While certain embodiments of the present invention have been described in detail, those familiar with the art to which this invention relates will recognize various alternative designs and embodiments for practicing the invention as defined by the following claims.

The invention claimed is:

1. A badge comprising:
an amorphous metal shell having a visible surface and an opposed back surface; and
a plastic base molded to the back surface.

2. The badge of claim 1 wherein the amorphous metal shell includes molded-in details extending upward from the visible surface to form a visible design.

3. The badge of claim 2 further including a polymer visible layer molded to a portion of the visible surface, with the molded-in details extending outward from the polymer visible layer.

4. The badge of claim 3 wherein the polymer visible layer is semi-opaque.

5. The badge of claim 1 wherein the plastic base includes molded-in attachment apparatuses for securing the badge to a structure.

6. The badge of claim 5 wherein the attachment apparatuses include locators extending from the plastic base in a direction opposite from the amorphous metal shell.

7. The badge of claim 5 wherein the attachment apparatuses include at least one securement hook extending from the plastic base.

8. The badge of claim 1 wherein the amorphous metal shell includes an undercut that extends to a backside of the plastic base.

9. The badge of claim 1 wherein the plastic base is formed from polypropylene modified with about one percent maleic anhydride.

10. The badge of claim 1 wherein the amorphous metal shell is formed from one of a zirconium based alloy or a nickel chromium alloy.

11. A badge comprising:
an amorphous metal shell having a visible surface and an opposed back surface;
a plastic base molded to the back surface; and
a polymer visible layer molded to a portion of the visible surface.

12. The badge of claim 11 wherein the amorphous metal shell includes molded-in details extending upward from the visible surface to form a visible design.

13. The badge of claim 11 wherein the polymer visible layer is opaque.

14. The badge of claim 11 wherein the plastic base includes molded-in attachment apparatuses for securing the badge to a structure.

15. A method of forming a badge comprising:
molding an amorphous metal shell having a visible surface and an opposed back surface; and
molding a plastic base to the back surface.

16. The method of claim 15 further comprising:
molding a polymer visible layer to a portion of the visible surface.

17. The method of claim 15 wherein the step of molding the plastic base includes integrally molding attachment apparatuses extending from the plastic base, for securing the badge to a structure.

18. The method of claim 15 where the step of molding the amorphous metal shell includes integrally molding details extending upward from the visible surface to form a visible design.

* * * * *